United States Patent Office 2,789,033
Patented Apr. 16, 1957

2,789,033

TREATMENT OF HEAVY METAL FERROCYA-NIDES FOR THE RECOVERY OF HEAVY METAL SULFIDES

George O. Pruett, Cos Cob, Conn., assignor to American Cyanamid Company, New York, N. Y., a corporation of Maine No Drawing. Application December 14, 1954, Serial No. 475,290

13 Claims. (Cl. 23—134)

This invention relates to the treatment of heavy metal ferrocyanides for the recovery of heavy metal sulfides therefrom. More particularly, it is concerned with the production of nickel sulfide from nickel ferrocyanide.

In the past practice, heavy metal values have been recovered from heavy metal ferrocyanides involving methods which result in the rupture of the ferrocyanide ion. Illustrative of one such method is the fusion of nickel ferrocyanide with sodium to recover nickel cyanide, sodium cyanide and iron. Another method is to treat dry nickel ferrocyanide with ammonium chloride at elevated temperatures to yield ammonium cyanide, nickel chloride and ferrous cyanide. However, these methods are not wholly desirable because economically valuable ferrocyanide ion is thereby destroyed, rendering the recovery of heavy metal values unfeasible.

It is the principal object of the present invention to devise a process for the recovery of heavy metal values from heavy metal ferrocyanides without destroying the ferrocyanide ion.

Other objects will become apparent from the following description.

To this end, a heavy metal sulfide can be quantitatively recovered in a straight forward manner by treating an aqueous suspension of a heavy metal ferrocyanide with an inorganic sulfide. Surprisingly, the heavy metal sulfide which is formed during treatment, unexpectedly precipitates from the aqueous mixture. While it is not known why this phenomenon occurs, it is concluded that a heavy metal sulfide in the present environment is less soluble than is the corresponding heavy metal ferrocyanide.

It is an advantage of the process of the invention to obtain both a metal per se from the heavy metal sulfide by standard methods, such as by reductive roasting, and ferrocyanide ions without decomposing the ferrocyanide ion during the treatment. Thus, for example, the ferrocyanide ion recovered finds utility in the production of ferric ferrocyanide (Prussian Blue) as well as the reactant for the separation of heavy metals in trace quantities from solution.

For a fuller understanding of the present invention, the process will be described with reference to the treatment of nickel ferrocyanide with sodium sulfide as illustrative. While nickel ferrocyanide is employed as the heavy metal ferrocyanide, ferrocyanides of other heavy metals are similarly amenable to treatment. These heavy metals include cobalt, copper, zinc and the like. As examples of inorganic sulfides, hydrogen sulfide as well as alkali or alkaline earth metal sulfides, such as the sulfides of sodium, potassium, lithium, calcium and the like, can be employed.

According to the process of the invention, an aqueous suspension of nickel ferrocyanide is reacted with an equivalent or slightly higher equivalent amount of sodium sulfide. Nickel sulfide, although somewhat colloidal, is almost quantitatively precipitated under controlled pH conditions. The filtrate obtained is sodium ferrocyanide. The pH of the mixture is maintained between 9 and 12 or higher to obtain a precipitate within a relatively short time, usually within about six hours or less. In general, the higher the pH, the faster precipitation occurs. Where the alkalinity is maintained at a pH below 9, the desired precipitate does not appear to form even after the lapse of several days. This alkalinity is supplied to the reaction mixture by any of the standard methods, such as by the addition of ammonium hydroxide, sodium hydroxide, potassium carbonate and the like.

However, to insure more rapid precipitation of the thus-formed nickel sulfide, a coagulant for the heavy metal sulfide may advantageously be added to the reaction mixture. In so proceeding, the nickel sulfide which is somewhat colloidal in this environment, easily and rapidly precipitates from the reaction mixture. The coagulant is added thereto in minor quantities (i. e., in the range of 0.01% to 1%) and includes either polyacrylamide or hydrogen peroxide. Air blowing will also cause coagulation of the heavy metal sulfide in the same manner as do the aforementioned chemical coagulants. Alternatively, air blowing in the presence of small amounts of polyacrylamide is highly effective.

In preparing the aqueous suspension of nickel ferrocyanide, 0.1%–3.0% by weight nickel ferrocyanide is added to 99.9%–97.0% of water. Where more than about 3% of the ferrocyanide is added to water, a thick "mud" results which cannot be conveniently treated in accordance with the present process. The total sulfide reactant utilized is advantageously employed within the range of from about 0.20% to 8.0% based on the weight of heavy metal ferrocyanide. It has been found that the order of introducing the reactants is not critical.

The invention will be more fully illustrated in the following specific examples. It should be understood, however, that although these examples may describe some of the more specific features of the invention, they are given primarily for the purposes of illustration and the invention in its broader aspects is not limited thereto.

*Example I*

To one liter of an aqueous suspension containing 5.6 gms. of nickel ferrocyanide (0.017 mol) is added 3.9 grams of sodium sulfide (0.050 mol) with agitation for two and one-half hours. Four drops of 1% polyacrylamide is then added to the agitated mixture and black nickel sulfide precipitates within thirty minutes. The latter is removed by filtration. The filtrate is water-white. However, to determine whether or not any nickel ion is present in the filtrate, the filtrate is subjected to a standard glyoxime test, which test indicates the absence of any nickel ion. The recovery of nickel sulfide is quantitative. To the resultant filtrate is added 0.5 gram of ferric sulfate. An intense blue coloration resulted, indicating the presence of ferrocyanide ion since Prussian Blue is formed.

While sodium sulfide is employed in this example, lithium sulfide or potassium sulfide can be substituted for sodium sulfide, with similar results.

In another run, the procedure, as outlined above was followed except polyacrylamide was not added to the reaction mixture. It was observed that the nickel precipitated in about one and one-half hours.

*Example II*

The procedure of Example I is followed except that cobalt ferrocyanide is substituted for nickel ferrocyanide therein. Recovery of cobalt sulfide is found to be quantitative.

Example III

Into a reaction flask supplied with a stirrer is suspended 10 gm. of nickel ferrocyanide (0.033 mol) in 1 liter of water. 5.0 gram of calcium sulfide (0.07 mol) is then added with agitation, while adding ammonium hydroxide to maintain the alkalinity of the solution at a pH between 11 and 11.5. Agitation is continued for one and one-quarter hours. A tube through which air is blown is inserted into the reaction vessel. Five drops of 1% polyacrylamide are simultaneously added thereto. Air is introduced for about 10 minutes until no further precipitation is noted. Its introduction is then discontinued. The black nickel sulfide is recovered quantitatively by filtration. The filtrate was tested for the presence of the ferrocyanide ion, by adding ferric sulfate thereto. An intense blue coloration of Prussian Blue appeared. This indicates the presence of ferrocyanide ion.

In this example, small amounts of hydrogen peroxide (0.01%–0.1%) can replace the step of air blowing. However, the sulfide precipitated in about sixteen minutes.

Example IV

Repeating the procedure of Example III, a mixture of equal amounts of nickel ferrocyanide and cobalt ferrocyanide is substituted for nickel ferrocyanide of that example. A mixture of nickel sulfide and cobalt sulfide is obtained as a precipitate in quantitative amounts.

I claim:

1. A process for treating a heavy metal ferrocyanide for the recovery of a heavy metal sulfide comprising the steps of: suspending in water a heavy metal ferrocyanide; adding thereto an inorganic sulfide selected from the class consisting of hydrogen sulfide, alkali metal sulfide and alkaline earth metal sulfide, while agitating the mixture at a pH of at least 9 to form a reaction mixture; precipitating resultant metal sulfide; and separating heavy metal sulfide from said mixture.

2. A process for treating a heavy metal ferrocyanide for the recovery of a heavy metal sulfide comprising the steps of: suspending in water a heavy metal ferrocyanide, said heavy metal being selected from the group consisting of nickel, cobalt and mixtures thereof, adding thereto an equivalent amount of inorganic sulfide selected from the class consisting of hydrogen sulfide, alkali metal sulfide and alkaline earth metal sulfide, while agitating the mixture at a pH of at least 9 to form a reaction mixture; precipitating heavy metal sulfide; and separating heavy metal sulfide from said mixture.

3. A process for treating a heavy metal ferrocyanide for the recovery of a heavy metal sulfide comprising the steps of: suspending a heavy metal ferrocyanide in water, said water comprising between 97%–99.9% by weight of said heavy metal ferrocyanide; adding thereto an equivalent amount of an inorganic sulfide selected from the class consisting of hydrogen sulfide, alkali metal sulfide and alkaline earth metal sulfide, while agitating said mixture at a pH of at least 9 to form a reaction mixture; precipitating heavy metal sulfide; and separating heavy metal sulfide from said mixture.

4. A process for treating a heavy metal ferrocyanide for the recovery of a heavy metal sulfide comprising the steps of: suspending in water a heavy metal ferrocyanide, said heavy metal being selected from the group consisting of nickel, cobalt and mixtures thereof, said water comprising between 97% and 99.9% by weight based on the heavy metal ferrocyanide; adding thereto an equivalent amount of an inorganic sulfide to form a reaction mixture, said sulfide being selected from the group consisting of hydrogen sulfide, alkali metal sulfide and alkaline earth metal sulfide, while agitating the reaction mixture at a pH above about 9; precipitating heavy metal sulfide; and separating heavy metal sulfide from said mixture.

5. A method according to claim 1 wherein the pH of the solution is maintained at from about 9 to about 12 during agitation.

6. A method according to claim 4 wherein the pH of the solution is maintained from about 9 to about 12 during agitation.

7. A method according to claim 1 wherein a coagulant for the heavy metal sulfide in minor amount is employed.

8. A method according to claim 7 wherein the range from about 0.01% to 1% of polyacrylamide coagulant is employed.

9. A method according to claim 7 wherein the range from about 0.01% to 0.1% of hydrogen peroxide is employed.

10. A process for treating nickel ferrocyanide for recovery of nickel sulfide comprising the steps of: suspending in water nickel ferrocyanide; adding an equivalent amount of sodium sulfide while agitating at a pH at least 9 to form a reaction mixture; precipitating nickel sulfide; and separating nickel sulfide from said mixture.

11. A process for treating nickel ferrocyanide for recovery of nickel sulfide comprising the steps of: suspending in water nickel ferrocyanide, said water comprising between 97% and 99.9%; adding an equivalent amount of calcium sulfide while agitating to form a reaction mixture; adding ammonium hydroxide to maintain the mixture at a pH of at least above about 9; air blowing the reaction mixture, precipitating nickel sulfide from the aqueous mixture; and separating nickel sulfide from said mixture.

12. A process for treating cobalt ferrocyanide for the recovery of cobalt sulfide comprising the steps of: suspending in water cobalt ferrocyanide, said water comprising between 97% and 99.9%; adding an equivalent amount of sodium sulfide while agitating to form a reaction mixture; adding ammonium hydroxide to maintain the mixture at a pH of at least 9; air blowing and adding polyacrylamide in minor amount to the reaction mixture and precipitating cobalt sulfide from the aqueous mixture; and separating said cobalt sulfide from the mixture.

13. A process for treating a mixture of nickel ferrocyanide and cobalt ferrocyanide for the recovery of a mixture of nickel sulfide and cobalt sulfide which comprises the steps of: suspending said nickel ferrocyanide and cobalt ferrocyanide mixture in water, said water comprising between 97% and 99.9% of the mixture; adding an equivalent amount of calcium sulfide thereto while agitating to form a reaction mixture; adding ammonium hydroxide to maintain the mixture at a pH of at least above 9 to effect co-precipitation of a mixture of nickel sulfide and cobalt sulfide; and recovering the latter co-precipitated nickel sulfide and cobalt sulfide.

No references cited.